(12) United States Patent
Lee et al.

(10) Patent No.: US 10,197,789 B2
(45) Date of Patent: Feb. 5, 2019

(54) SMART PIXEL BLIND

(71) Applicant: INDUSTRY-ACADEMIC COOPERATION FOUNDATION, YONSEI UNIVERSITY, Seoul (KR)

(72) Inventors: Soo-Hong Lee, Seoul (KR); Dae-Eun Kim, Seoul (KR); Jeonggyu Lee, Busan (KR); Min Hyuk Woo, Seoul (KR); Hyun-Tae Hwang, Changwon-si (KR); Sungeun Lee, Seoul (KR); Sunghoon Lee, Seoul (KR); Sangki Kim, Seoul (KR); Heungryong Jee, Seoul (KR); Hojoon Son, Seoul (KR); Hyebin Kim, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 15/437,944

(22) Filed: Feb. 21, 2017

(65) Prior Publication Data
US 2018/0143424 A1    May 24, 2018

(30) Foreign Application Priority Data

Nov. 22, 2016   (KR) ........................ 10-2016-0155848

(51) Int. Cl.
| | |
|---|---|
| G02B 26/02 | (2006.01) |
| E06B 9/24 | (2006.01) |
| E06B 9/26 | (2006.01) |
| E06B 9/386 | (2006.01) |
| H04M 1/725 | (2006.01) |
| H04W 52/02 | (2009.01) |

(52) U.S. Cl.
CPC ............... *G02B 26/02* (2013.01); *E06B 9/24* (2013.01); *E06B 9/26* (2013.01); *E06B 9/386* (2013.01); *H04M 1/7253* (2013.01); *H04W 52/027* (2013.01); *E06B 2009/2482* (2013.01)

(58) Field of Classification Search
None
See application file for complete search history.

(56) References Cited

U.S. PATENT DOCUMENTS

2008/0218369 A1* 9/2008 Krans ................. A47G 9/1045
340/691.1

FOREIGN PATENT DOCUMENTS

| | | |
|---|---|---|
| JP | 2000320274 | 11/2000 |
| JP | 2001154620 | 6/2001 |
| KR | 20-0355883 | 7/2004 |
| KR | 20150111334 | 10/2015 |

* cited by examiner

*Primary Examiner* — Jennifer D. Carruth
(74) *Attorney, Agent, or Firm* — Hauptman Ham, LLP

(57) ABSTRACT

Provided is a smart pixel blind having aesthetics that may be felt by a user by including a plurality of pixels disposed in a two-dimensional array. In the smart pixel blind, driving devices are provided in the respective pixels, and when the user inputs a predetermined shape using a portable terminal, or the like, a main controller receives the input shape and controls the driving devices provided in the respective pixels to allow the input shape to be displayed.

6 Claims, 11 Drawing Sheets

SMART PIXEL BLIND

CROSS-REFERENCE TO RELATED APPLICATIONS

This application claims priority under 35 U.S.C. § 119 to Korean Patent Application No. 10-2016-0155848, filed on Nov. 22, 2016, in the Korean Intellectual Property Office, the disclosure of which is incorporated herein by reference in its entirety.

TECHNICAL FIELD

The following disclosure relates to a smart pixel blind. More particularly, the following disclosure relates to a smart pixel blind capable of displaying a shape input to a portable terminal by a user by interworking with the portable terminal, or the like.

BACKGROUND

A general blind serves to block solar light irradiated to the interior together with a curtain and allows the interior not to be viewed from the exterior due to privacy of a user, or the like. The blind may be opened by a desired level of illumination through adjustment of a height, adjustment of an angle, or the like, in the related art, and has been used in a scheme in which several blind panels are stacked in one direction when it is not used.

In addition, recently, the Internet of Things (IoT) has been conducted on many products in households and companies, and it has been an important industrial challenge to allow these products to be compatible with the other products and allow users to conveniently use these products. Therefore, the blinds have also become gradually smart, and products compatible with portable terminals individually possessed by everyone have been developed.

Korean Patent Laid-Open Publication No. 10-2015-0111334 (entitled "Manual/Automatic Blind Control System Based on Smart Phone and Driving Method Thereof") has disclosed technology of controlling the blind by transmission and reception between the portable terminal and the blind as described above. The system described above is configured to include a portable terminal 1, a gateway 2, and manual/automatic blinds 3, as illustrated in FIG. 1. In more detail, a user may manipulate the portable terminal 1 to adjust angles of panels provided in the manual/automatic blinds 3 or allow the panels to ascend or descend.

However, the system described above only controls a general blind by interworking with a wireless interface, and functions of the blind itself are not improved. In addition, aesthetics for the blind itself occupying most of a space of a wall is not improved.

RELATED ART DOCUMENT

Patent Document

Korean Patent Laid-Open Publication No. 10-2015-0111334 (entitled "Manual/Automatic Blind Control System Based on Smart Phone and Driving Method Thereof" and published on Oct. 5, 2015)

SUMMARY

An embodiment of the present invention is directed to providing a smart pixel blind capable of displaying a desired rather than being simply opened or closed by partitioning a blind body, being more easily manipulated by interworking with a portable terminal, and saving power by constituting a plurality of actuators in a magnetic form.

In one general aspect, a smart pixel blind includes: a blind body 10 adjusting an amount of irradiated light input from an exterior; and a plurality of pixels 100 formed in the blind body 10, disposed in a two-dimensional array, having predetermined areas, and formed to be opened or closed.

The smart pixel blind may further include a plurality of connecting parts 200 connecting the pixels 100 formed in the same row or column to each other, wherein the plurality of connecting parts 200 are spaced apart from each other by a predetermined distance.

The smart pixel blind may further include driving parts 300 each provided on the pixels 100 so that the pixels 100 rotate in relation to the connecting parts 200 to be opened or closed.

The connecting part 200 may include: a plurality of shield boxes 220 in which insertion holes 222 into which the driving parts 300 are inserted are formed; and a connecting bar 210 connecting the plurality of shield boxes 220 to each other.

The driving part 300 may include: a fixed part 320 having a hole vertically formed therein and inserted and fixed into the insertion hole 222 of the shield box 220; a rotating part 310 disposed to penetrate through the hole of the fixed part 320 and having one pixel 100 coupled to one side thereof; and a shaft 330 positioned at a center of the hole of the fixed part and penetrating through a central portion of the rotating part to allow the rotating part to rotate around the central portion of the rotating part.

The driving part 300 may further include an adaptor 340 inserted into the insertion hole 222 of the shield box 220 to receive power.

The fixed part 320 may have a protrusion surface 321 formed on an upper surface thereof, and have a fixed magnetic pole 322 formed on the protrusion surface 321, the rotating part 310 may have a first moving magnetic pole 311 formed at the other side thereof, and when power is applied to the first moving magnetic pole 311 through the adaptor 340, the fixed magnetic pole 322 and the first moving magnetic pole 311 may face each other, such that the pixels 100 are completely opened.

The rotating part 310 may have a second moving magnetic pole 312 formed at a central portion thereof, and when power is applied to the second moving magnetic pole 312 through the adaptor 340, the fixed magnetic pole 322 and the second moving magnetic pole 312 may face each other, such that the pixels 100 are partially opened.

The smart pixel blind may further include a main controller 400 formed on the blind body 10 and outputting opening or closing commands to the respective driving parts 300 to open or close the plurality of pixels 100.

The smart pixel blind may further include a portable terminal 500 connected to the main controller 400 by wired or wireless communication, wherein the plurality of pixels 100 are opened or closed on the basis of a shape input to the portable terminal 500.

[Detailed Description of Main Elements]

Figure 1:
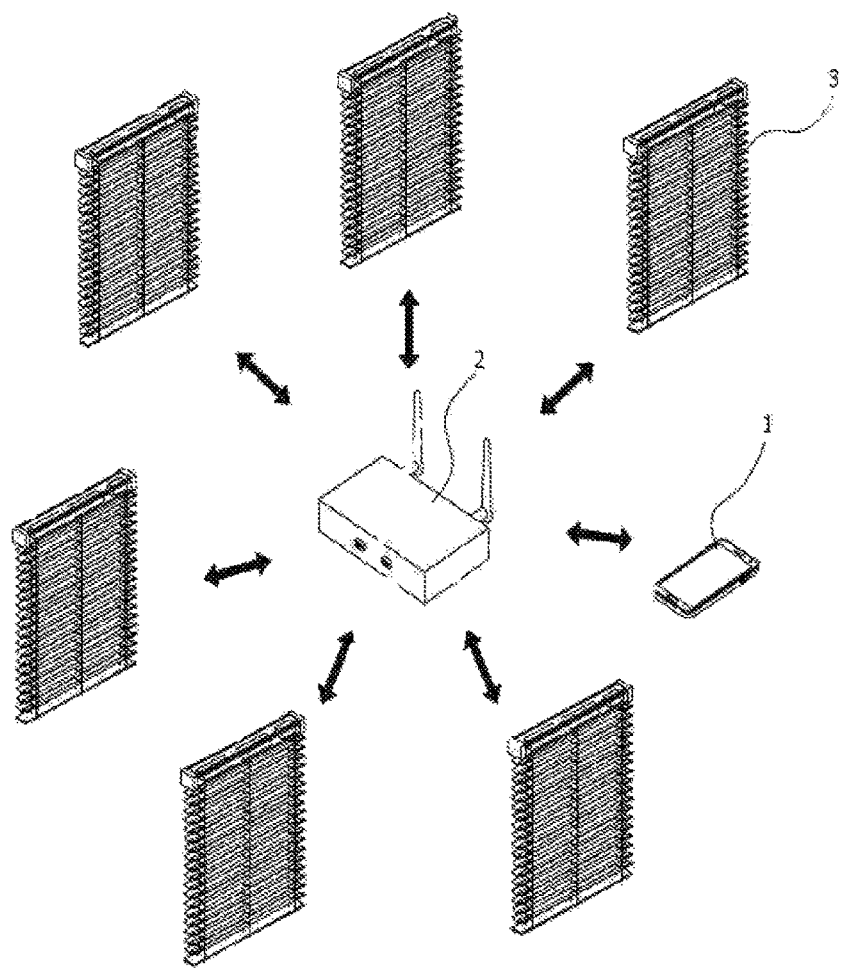
FIG. 1 is a block diagram illustrating a control system according to the related art.

| | |
|---|---|
| 10: blind body | |
| 100: pixel | |
| 200: connecting part | |
| 210: connecting bar | 220: shield box |
| 221: shield body | 222: insertion hole |
| 300: driving part | |
| 310: rotating part | |
| 311: first moving magnetic pole | 312: second moving magnetic pole |
| 313: detachable part | |
| 320: fixed part | |
| 321: protrusion surface | 322: fixed magnetic pole |
| 330: shaft | 340: adaptor |
| 400: main controller | |
| 410: display part | 420: switch |
| 500: portable terminal | |

DETAILED DESCRIPTION OF EMBODIMENTS

Hereinafter, a smart pixel blind according to the present invention will be described in detail with reference to the accompanying drawings. The accompanying drawings to be provided below are provided by way of example so that the idea of the present invention can be sufficiently transferred to those skilled in the art to which the present invention pertains. Therefore, the present invention is not limited to the accompanying drawings to be provided below, but may be implemented in other forms. In addition, like reference numerals denote like elements throughout the specification.

Technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

First Exemplary Embodiment

Figure 2:
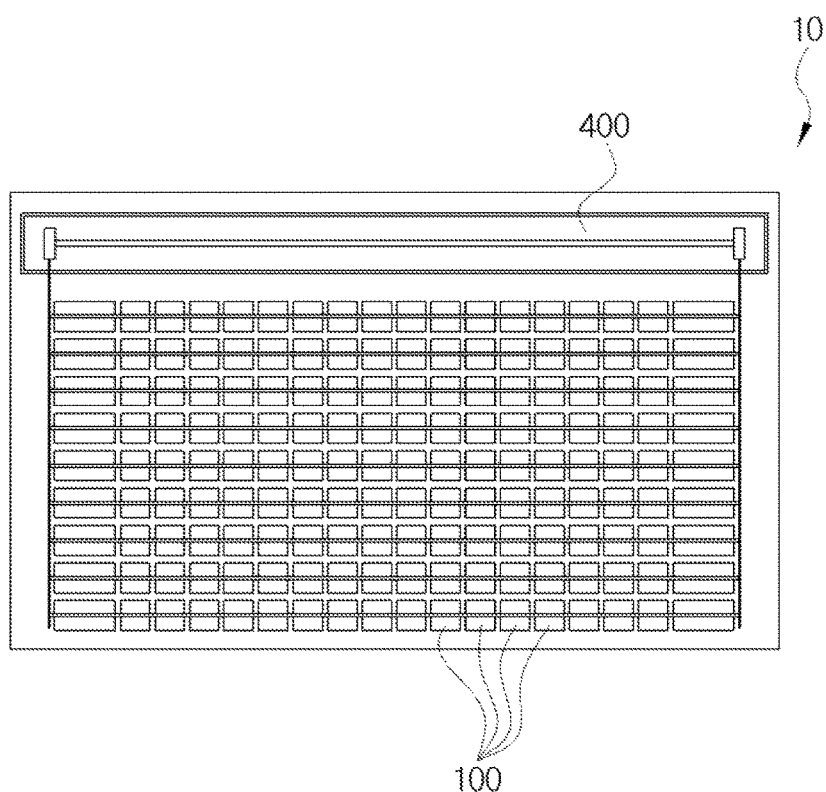
FIG. 2 is a front view of a smart pixel blind according to an exemplary embodiment of the present invention.

FIG. 2 is a front view of a smart pixel blind according to an exemplary embodiment of the present invention. Referring to FIG. 2, the smart pixel blind according to an exemplary embodiment of the present invention may be configured to include a blind body 10 adjusting an amount of irradiated light input from the exterior and a plurality of pixels 100 formed in the blind body 10, disposed in a two-dimensional array, having predetermined areas, and formed to be opened or closed. Here, the blind body 10 is not limited to a casing, but is an entire configuration including the plurality of pixels 100 and components connecting the plurality of pixels to each other and controlling the plurality of pixels.

The plurality of pixels 100 may have the predetermined areas, respectively, as illustrated in FIG. 2, and may be formed to be spaced apart from each other by a predetermined distance to have the same function as that of one display. Generally, an electronic display apparatus displays any image using a light source, but the present invention may have a function of mechanically displaying any shape through the plurality of pixels 100.

In addition, the smart pixel blind may further include a main controller 400 formed on the blind body 10 and connected to the plurality of pixels 100 to transfer opening or closing signals to the plurality of pixels. This function will be described in more detail with reference to FIG. 8.

Figure 3:
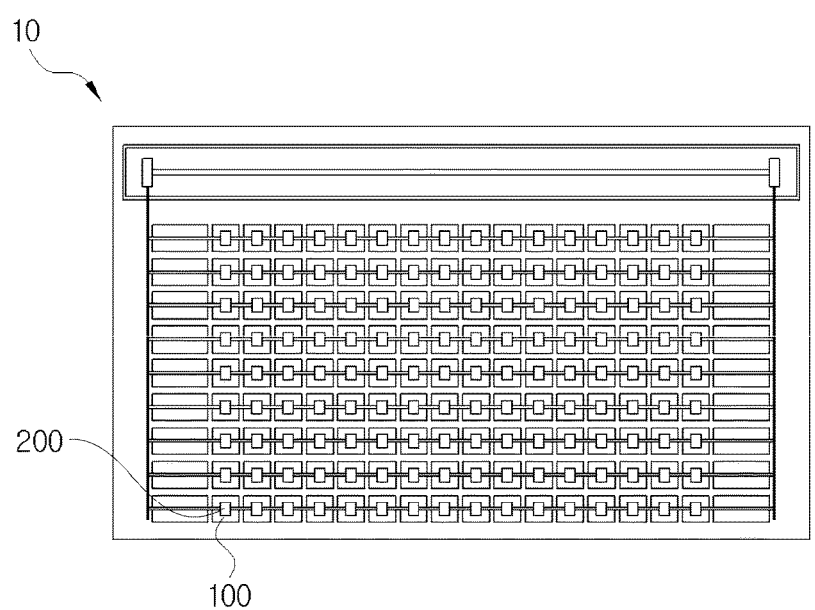
FIG. 3 is a rear view of the smart pixel blind according to an exemplary embodiment of the present invention.

FIG. 3 is a rear view of the smart pixel blind according to an exemplary embodiment of the present invention. Referring to FIG. 3, the smart pixel blind according to an exemplary embodiment of the present invention may further include a plurality of connecting parts 200 connecting the pixels 100 formed in the same row or column to each other. In FIG. 3, the connecting parts 200 are extended in a horizontal direction to connect a plurality of pixels 100 disposed in a row direction (the horizontal direction) to each other while supporting the plurality of pixels 100 disposed in the row direction. The connecting parts can be also extended in a vertical direction to connect a plurality of pixels 100 disposed in a column direction (the vertical direction) to each other while supporting the plurality of pixels 100 disposed in the column direction. However, the latter will be not described in detail since it may be sufficiently derived from the contents described above. Both of the plurality of pixels 100 disposed in the row direction and the column direction may be connected to each other by the connecting parts 200.

The connecting parts 200 may be configured in parallel with rotational center axes of the pixels 100, and the pixels 100 may rotate around the connecting parts 200 to be opened or closed. In this case, the smart pixel blind may further include driving parts 300 each provided on the pixels 100 so that the pixels 100 rotate in relation to the connecting parts 200. The driving part 300, which is a component having a function of transferring power to the pixel 100, may be implemented in various schemes, but is preferably implemented a servomotor or magnetic actuator scheme. In connection with this, a driving part implemented by a magnetic actuator will be described later in detail.

Figure 4:
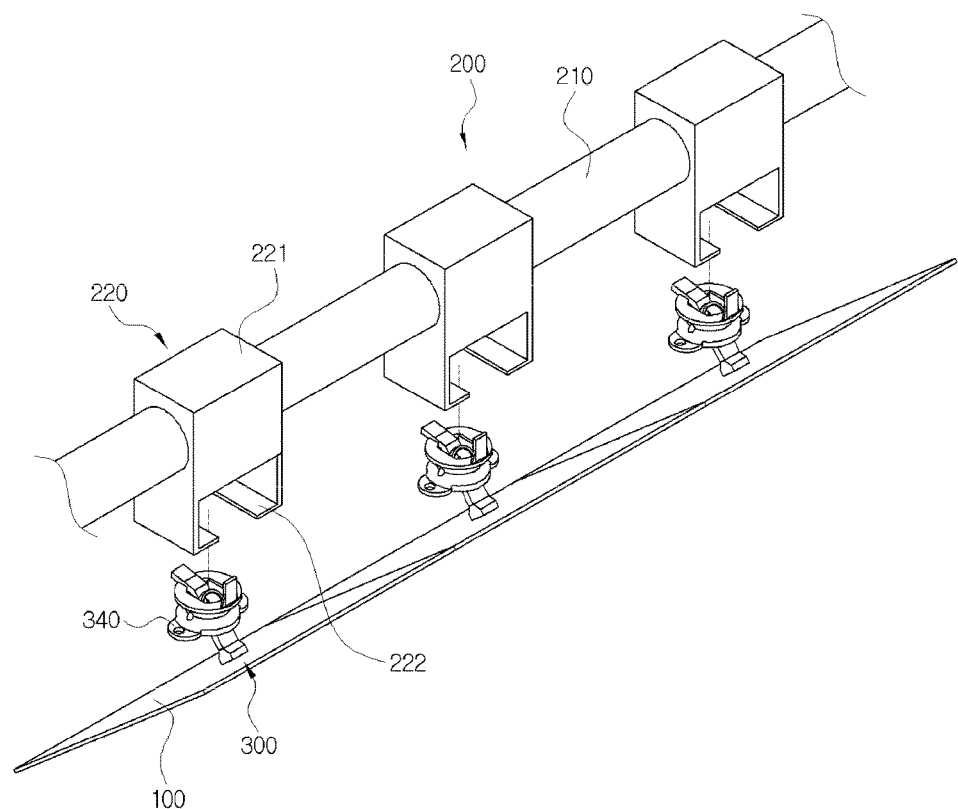
FIG. 4 is a perspective view of a connecting part and driving parts according to an exemplary embodiment of the present invention.

FIG. 4 is a perspective view of a connecting bar 210 and the driving parts 300 in the smart pixel blind according to an exemplary embodiment of the present invention. Referring to FIG. 4, the connecting part 200 according to an exemplary embodiment of the present invention may be configured to include a plurality of shield boxes 220 in which insertion holes 222 into which the driving parts 300 may be inserted are formed, and the connecting bar 210 connecting the plurality of shield boxes 220 corresponding to the same row or column to each other. FIG. 4 illustrates the connecting bar 210 connecting the plurality of shield boxes 220 in the same row to each other, and the shield boxes 220 may be configured to include shield bodies 221 having a function of preventing electromagnetic interference between the plurality of driving parts 300.

In addition, the driving parts 300 may include adaptors 340 inserted into the insertion holes 222 of the shield boxes 220 to receive power, and the insertion holes 222 may have support jaws to support the driving parts 300 so that the driving parts 300 are not separated from the insertion holes 222 after they are inserted into the insertion holes 222.

The plurality of shield boxes 220 may be formed to be spaced apart from each other on the connecting bar 210 formed in the row or column direction. It is preferable that a spaced distance between the plurality of shield boxes 220 is the same as a width of the pixel 100 or is slightly larger than a width of the pixel 100 so that the pixels 100 do not interfere with each other. In addition, since the driving parts 300 in which magnetic actuators are embedded are inserted into the insertion holes 222 of the shield boxes 220, the driving parts 300 may be provided in the same number as that of the shield boxes 220, and may be coupled to the shield boxes 220, respectively. A detailed configuration of the driving part 300 will be described with FIG. 5 in which the driving part 300 is enlarged.

Figure 5:
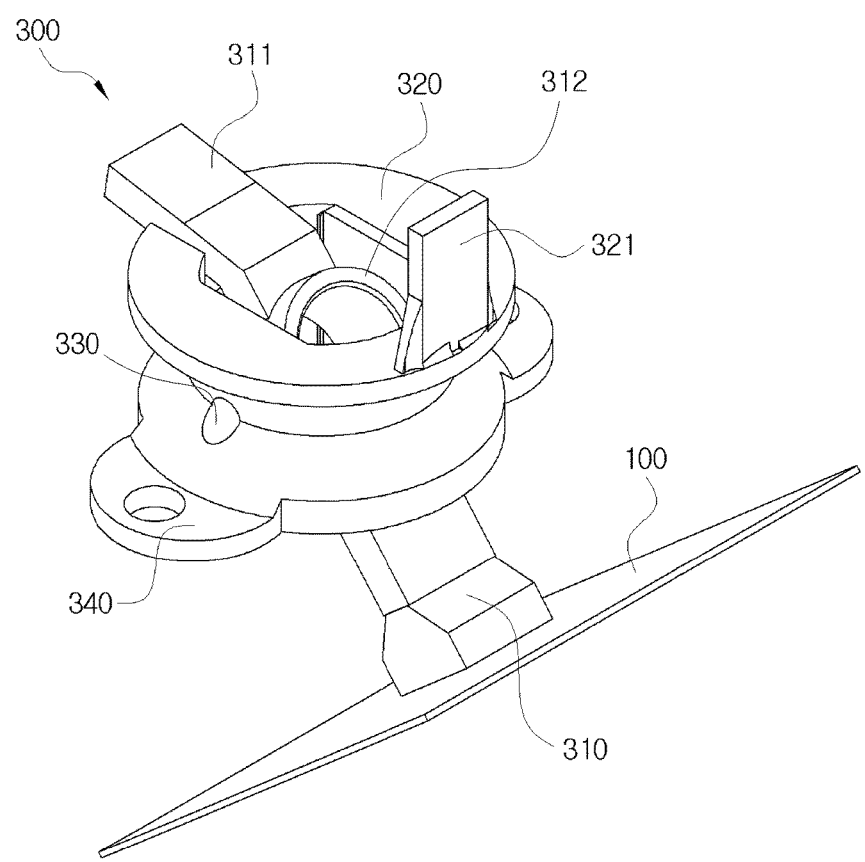
FIG. 5 is a perspective view of a driving part to which a pixel is attached according to an exemplary embodiment of the present invention.
Figure 6:
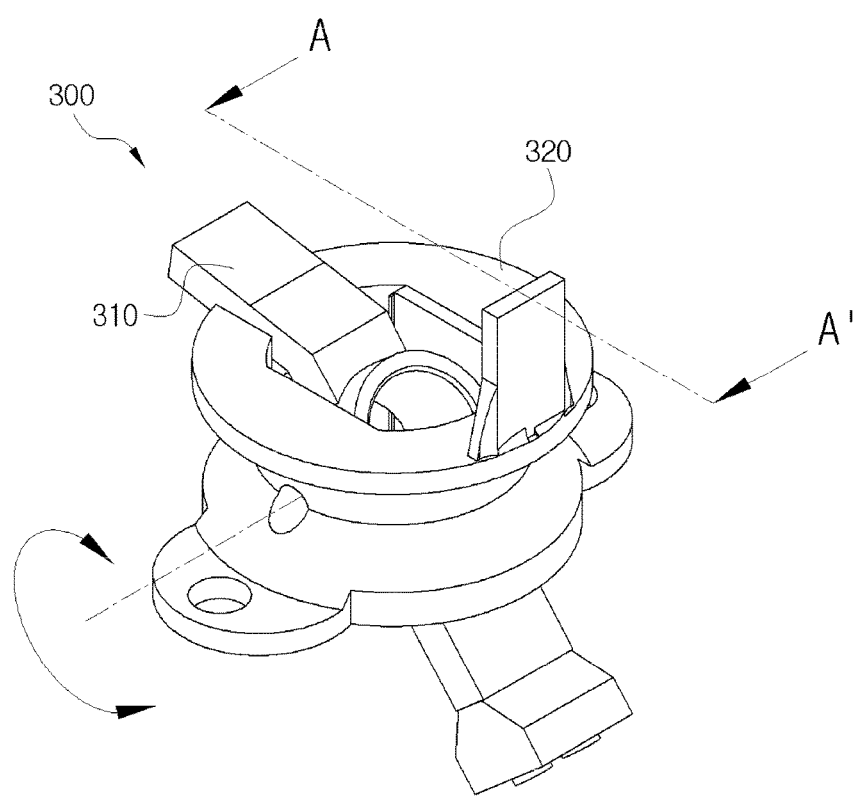
FIG. 6 is a perspective view of the driving part according to an exemplary embodiment of the present invention.

FIGS. 5 and 6 are, respectively, a perspective view of the driving part 300 to which the pixel 100 is attached and a perspective view of the driving part 300, in the smart pixel blind according to an exemplary embodiment of the present invention. Referring to FIG. 5, the driving part 300 may include a rotating part 310, a fixed part 320, and the adaptor 340. Here, the fixed part 320 and the adaptor 340 are fixed devices, and the rotating part 310 is disposed to penetrate through a hole vertically formed in the fixed part 320 and rotates around a central portion thereof positioned in the hole of the fixed part 320 to enable the pixel 100 to be opened or closed.

The fixed part 320 has a protrusion surface 321 formed on an upper surface thereof, and has a fixed magnetic pole 322 formed on the protrusion surface 321. The pixel 100 is coupled to one side of the rotating part 310, and a first moving magnetic pole 311 is formed at the other side of the rotating part 310. The first moving magnetic pole 311 is configured to face the protrusion surface 321 by rotation of the rotating part 310. In addition, the rotating part 310 may further include a second moving magnetic pole 312 formed at a central portion thereof. When the first moving magnetic pole 311 faces the protrusion surface 321, the pixel 100 may be completely opened, and when the second moving magnetic pole 312 faces the protrusion surface 321, the pixel 100 may be partially opened.

In addition, the driving part 300 may include a shaft 330 so that the rotating part 310 may rotate around the central portion thereof positioned in the hole of the fixed part 320, and the shaft 330 may be positioned at the center of the hole of the fixed part 320, and may be formed to penetrate through the central portion of the rotating part 310.

FIG. 6 illustrates a state in which the pixel 100 is removed from the rotating part 310 illustrated in FIG. 5, and an operation principle of the rotating part 310 and the fixed part 320 will be described below with reference to a cross-sectional view taken along line A-A'.

Figure 7A:
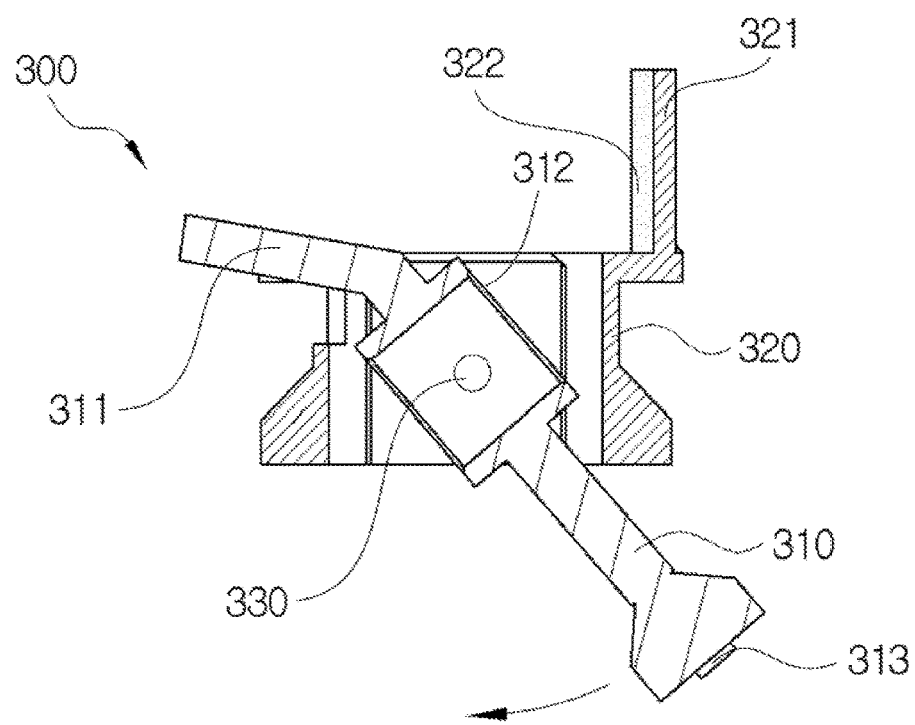
FIGS. 7A to 7C are illustrative views of an operation of the driving part according to an exemplary embodiment of the present invention.
Figure 7B:
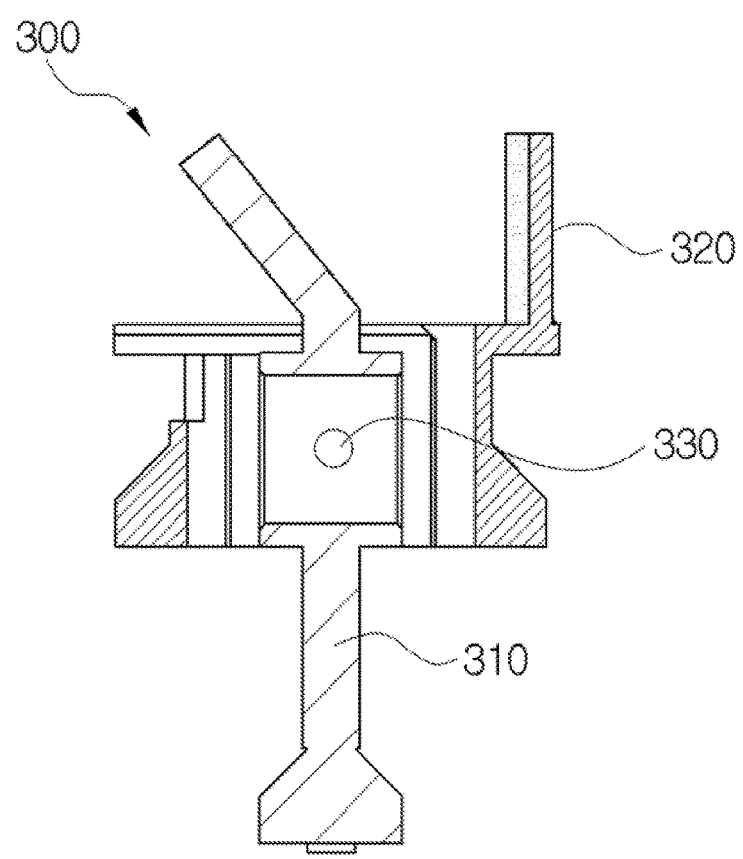
Figure 7C:
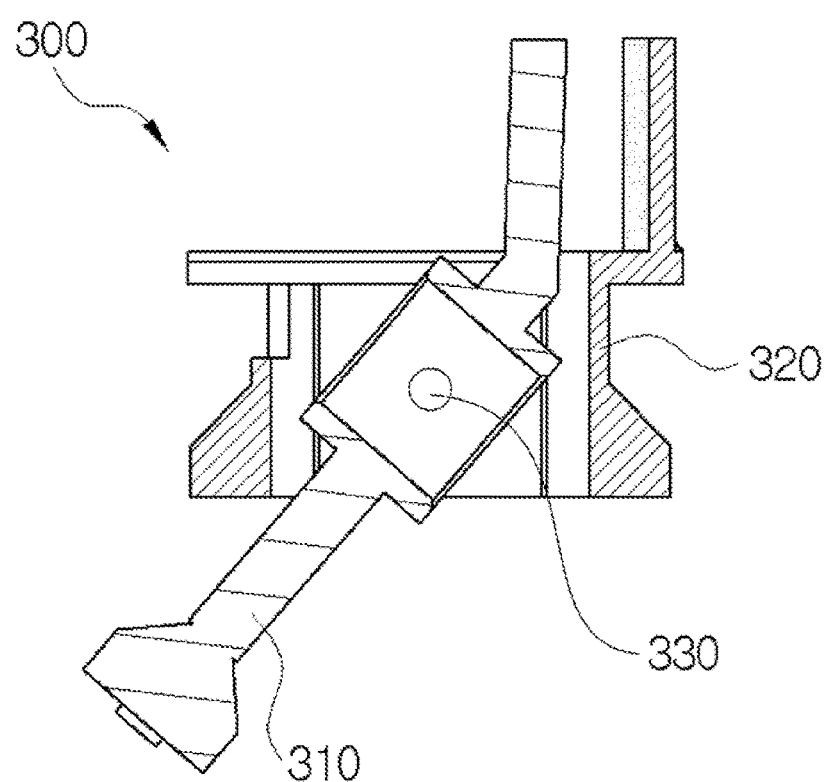

FIGS. 7A to 7C are illustrative views of an operation of the driving part in the smart pixel blind according to an exemplary embodiment of the present invention. Referring to FIGS. 7A to 7C, it may be confirmed that an opened or closed level of the pixel 100 may be adjusted by adjusting a rotating level of the rotating part 310 in a state in which the fixed part 320 is fixed. Here, in the case in which a detachable part 313 formed at one side of the rotating part 310 is directed toward the southeast as illustrated in FIG. 7A, the pixels 100 are directed toward a front surface to be in a closed state, and in the case in which the detachable part 313 formed at one side of the rotating part 310 is directed toward the southwest as illustrated in FIG. 7C, the pixels 100 are in an opened state. FIG. 7B illustrates that the pixels 100 are partially opened in a diagonal direction, and an amount of irradiated light introduced into the interior may be adjusted by adjusting an opened level of the pixels 100, as described above.

In more detail, as illustrated in FIG. 7A, the rotating part 310 according to the present invention may include the first moving magnetic pole 311 formed at the other side thereof and the second moving magnetic pole 312 formed at the central portion thereof. When power is applied to the second moving magnetic pole 312 through a controller, the second moving magnetic pole 312 and the fixed magnetic pole 322 formed on the protrusion surface 321 face each other by magnetic force, as illustrated in FIG. 7B, such that the pixels 100 may be partially opened. In addition, when power is applied to the first moving magnetic pole 311, the first moving magnetic pole 311 has magnetism. Therefore, as illustrated in FIG. 7C, the first moving magnetic pole 311 and the fixed magnetic pole 322 formed on the protrusion surface 321 of the fixed part 320 face each other, such that the pixels 100 may be completely opened. In this case, it is preferable that a rotation angle of the rotating part 310 is at most about 90 degrees.

Figure 8:
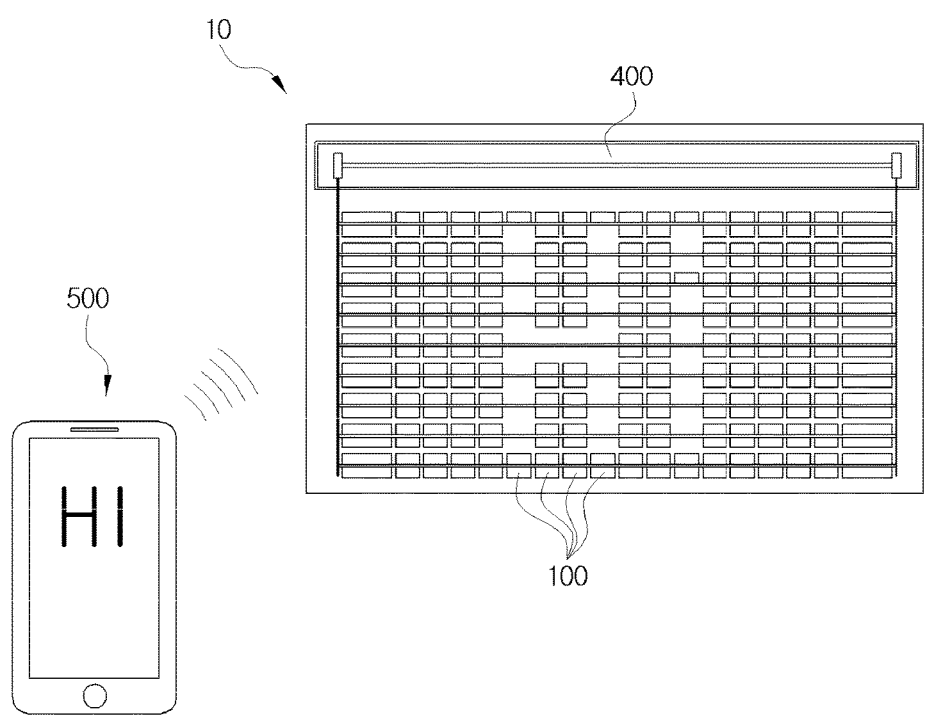
FIG. 8 is an illustrative view of an operation of the smart pixel blind according to an exemplary embodiment of the present invention.

FIG. 8 is an illustrative view of an operation of the smart pixel blind. Referring to FIG. 8, the smart pixel blind according to an exemplary embodiment of the present invention may further include a portable terminal 500 connected to the main controller 400 by wired or wireless communication, wherein the plurality of pixels 100 may be opened or closed on the basis of a shape input to the portable terminal 500. Here, the portable terminal 500 is not limited to only a smart phone, but may include all of any general input apparatuses.

When a user inputs "HI" to the portable terminal 500 as illustrated in FIG. 8, the portable terminal 500 converts "HI" into a transmission signal and transmits the transmission signal to the main controller 400, and the main controller 400 receives the transmission signal and again outputs opening or closing commands to the respective driving parts 300. Therefore, the plurality of pixels 100 may become a state in which they are completely opened, are partially opened, or are closed, respectively. When the user views the smart pixel blind, a three-dimensional image "HI" may be recognized, and solar light introduced from the exterior into the interior may serve as a light source, such that a character "HI" may be projected on the bottom. Since a display is possible in various schemes through this, various factors by which the user feels aesthetics are generated, and the smart pixel blind may perform a compositive function together with an advertisement, or the like.

Another Exemplary Embodiment

Figure 9:
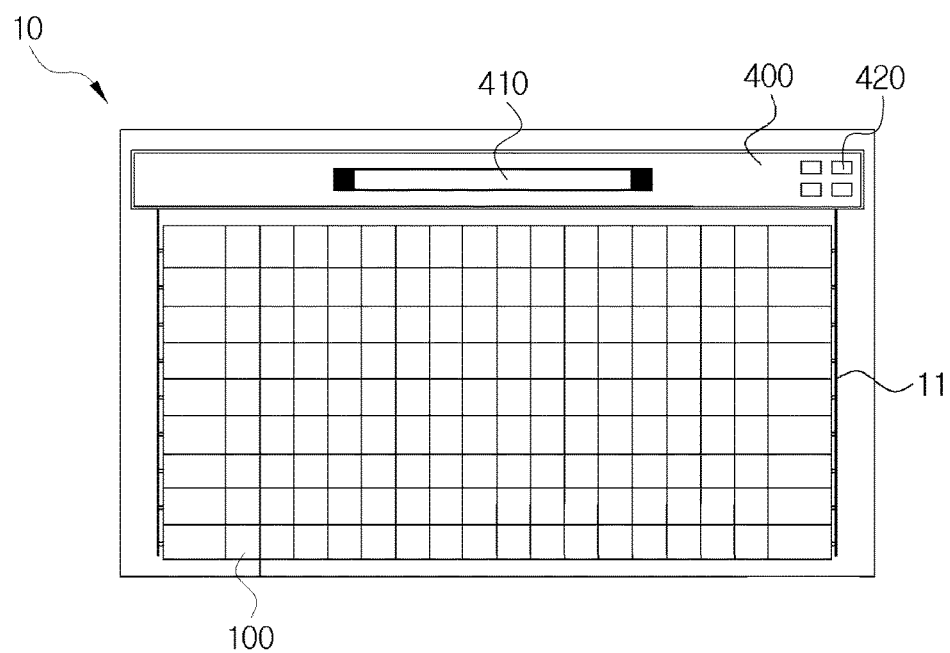
FIG. 9 is a front view of a smart pixel blind according to another exemplary embodiment of the present invention.

FIG. 9 is a front view of a smart pixel blind according to another exemplary embodiment of the present invention. FIG. 9 illustrates a state in which a spaced distance between a plurality of pixels 100 is the same as a width of the pixel 100. Since the plurality of pixels 100 basically serve to block light, it is preferable that the spaced distance between the plurality of pixels 100 is the same as the width of the pixel 100 as described above, and it is preferable that a fine interval is provided between the plurality of pixels 100 so that the respective pixels 100 do not interfere with each other at the time of being rotated.

The main controller 400 may be provided in several directions, and a case in which the main controller 400 is provided at the uppermost end and compositively includes various functions is illustrated in FIG. 9. In this case, the main controller 400 may include a display part 410 and a switch 420. The display part 410 may display a current time, an interior temperature, or the like, through a light emitting diode (LED) display. The switch 420 may include a manual mode and automatic mode conversion switch, a turn on/off switch of an entire system, and the like.

In the smart pixel blind according to an exemplary embodiment of the present invention having the configuration as described above, the blind body is partitioned into the plurality of pixels disposed in the two-dimensional array, such that solar light irradiated to the interior serves as one light source. Therefore, a shape appears as a shadow in the interior, and the blind body itself also displays one shape to provide a factor through which a user may feel aesthetics.

In addition, the plurality of pixels provided in the blind body may be manipulated through the portable terminal to provide several display functions such as events for lovers, advertisements, or the like, and the smart pixel blind is not only used to simply block solar light, but may also be used for wide purposes.

In addition, the pixels are rotated in a magnetic actuator scheme in order to prevent much power from being consumed in the respective pixels driven by the driving devices, thereby making it possible to minimize power consumption.

Hereinabove, although the present invention has been described by specific matters such as specific components, the exemplary embodiments, and the accompanying drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

What is claimed is:

1. A smart pixel blind comprising:
a blind body adjusting an amount of irradiated light input from an exterior;
a plurality of pixels formed in the blind body, disposed in a two-dimensional array, having predetermined areas, and formed to be opened or closed;
a plurality of connecting parts connecting the pixels formed in the same row or column to each other, wherein the plurality of connecting parts are spaced apart from each other by a predetermined distance; and
driving parts each provided on the pixels so that the pixels rotate in relation to the connecting parts to be opened or closed,
wherein the connecting part includes:
a plurality of shield boxes in which insertion holes into which the driving parts are inserted are formed; and
a connecting bar connecting the plurality of shield boxes to each other,
wherein the driving part includes:
a fixed part having a hole vertically formed therein and inserted and fixed into the insertion hole of the shield box;
a rotating part disposed to penetrate through the hole of the fixed part and having one pixel coupled to one side thereof; and
a shaft positioned at a center of the hole of the fixed part and penetrating through a central portion of the rotating part to allow the rotating part to rotate around the central portion of the rotating part.

2. The smart pixel blind of claim 1, wherein the driving part further includes an adaptor inserted into the insertion hole of the shield box to receive power.

3. The smart pixel blind of claim 2, wherein the fixed part has a protrusion surface formed on an upper surface thereof, and has a fixed magnetic pole formed on the protrusion surface,
the rotating part has a first moving magnetic pole formed at the other side thereof, and
when power is applied to the first moving magnetic pole through the adaptor, the fixed magnetic pole and the first moving magnetic pole face each other, such that the pixels are completely opened.

4. The smart pixel blind of claim 3, wherein the rotating part has a second moving magnetic pole formed at a central portion thereof, and
when power is applied to the second moving magnetic pole through the adaptor, the fixed magnetic pole and the second moving magnetic pole face each other, such that the pixels are partially opened.

5. The smart pixel blind of claim 1, further comprising a main controller formed on the blind body and outputting opening or closing commands to the respective driving parts to open or close the plurality of pixels.

6. The smart pixel blind of claim 5, further comprising a portable terminal connected to the main controller by wired or wireless communication,
wherein the plurality of pixels are opened or closed on the basis of a shape input to the portable terminal.

* * * * *